Patented May 1, 1928.

1,667,968

UNITED STATES PATENT OFFICE.

HANS JOACHIM FALCK, OF NOTODDEN, NORWAY, ASSIGNOR TO NORSK HYDRO-ELEKTRISK KVAELSTOFAKTISELSKAB, OF OSLO, NORWAY.

PROCESS FOR SEPARATING COMPOUNDS OF POTASSIUM FROM COMPOUNDS OF ALUMINUM.

No Drawing. Application filed January 5, 1925, Serial No. 683, and in Norway February 27, 1924.

When leucite and similar minerals are dissolved in nitric acid, a solution is obtained that chiefly contains potassium nitrate and aluminum nitrate. The separation of these by means of fractional crystallization is difficult, because when they are crystallized they fall out together. Several other ways of treatment which solve the problem have therefore been proposed, but in these, aluminum nitrate is not obtained, but alumina and nitrous gases or nitric acid beside the potassium nitrate respectively.

According to the present invention both potassium nitrate and aluminum nitrate can be produced from leucite and similar minerals when these are dissolved in nitric acid, the precipitation of potassium nitrate being attained first, and then, by means of a special process, the precipitation of aluminum nitrate is effected.

The fact that potassium nitrate is more easily dissolved in nitric acid of a high concentration than in weaker acid, the opposite being the case with aluminum nitrate, is in this process used for the technical solution of the problem.

I have discovered that when the dissolving of leucite is effected in nitric acid which already contains potassium nitrate the crystallization of salt mixtures of aluminum nitrate and potassium nitrate is no longer attained, but by means of the right concentration only pure potassium nitrate, and that, in somewhat larger quantities than correspond to the nitrate added.

By making use of these observations I have now been able to provide a technical method of producing potassium nitrate and aluminum nitrate from leucite and similar minerals.

The following is given as an example of how the method may be performed:

1 ton of leucite containing 195 kilogrammes of alumina soluble in acid and 160 kilogrammes of potash soluble in acid, are treated with a solution containing 1000 kilogrammes of free nitric acid, 200 kilogrammes of potassium nitrate and 70 kilogrammes of aluminum nitrate $(Al_2(NO_3)_6 18H_2O)$ and 1530 kilogrammes of water. Dissolving takes place at 70° C. When the dissolving process is finished the silicic acid is filtered from the solution. As diluted nitric acid has been used, the solution is concentrated so that each 100 cm³ contains 12,5 grammes of alumina. The solution is then cooled to 20° C. 320 kilogrammes of potassium nitrate is crystallized which is separated from the mother lye. The mother lye is then evaporated to such an extent that during the subsequent cooling of the solution a crystal mixture of 200 kilogrammes of potassium nitrate and 1370 kilogrammes of aluminum nitrate is obtained. After this mixture of crystals has been separated from the mother lye, which, among other things, contains the rest of the potassium and aluminum, it is stirred at 20° C. together with 800 kilogrammes of nitric acid, 60 per cent in strength. All the potassium nitrate and 70 kilogrammes of aluminum nitrate is thereby dissolved. 1300 kilogrammes of pure crystals of aluminum nitrate then remains. 1730 kilogrammes of nitric acid 30 per cent in strength is then added to the filtered solution whereupon a solution containing 1000 kilogrammes of free acid is obtained, which is used as mentioned at the beginning of this example.

It is mentioned in this example that the solution also contains aluminum nitrate. This is of no importance to the process itself as the aluminum nitrate has only occurred as an impurity in a later process. The less aluminum nitrate there is in the solution, the better, as then there will be smaller quantities of this salt circulating in the apparatus and this can be attained in a still greater degree by increasing the concentration of the acid that is used for treating the crystal mixture.

I claim:

1. Process for separating aluminum compounds from potassium compounds which comprises converting said compounds into nitrates, treating said nitrates with concentrated nitric acid and using the solution of potassium nitrate in nitric acid thus obtained for producing a mixture of potassium nitrate and aluminum nitrate from materials containing potassium and aluminum in an acid soluble state.

2. Process for separating aluminum compounds from potassium compounds which comprises converting the said compounds into nitrates, treating said nitrates with concentrated nitric acid, using the solution of potassium nitrates in nitric acid thus obtained for dissolving potassium and aluminum silicates soluble in nitric acid, separating part of the potassium nitrates from this solution by crystallization, evaporating and crystallizing the mother lye, treating the aluminum nitrate and potassium nitrate crystals thus obtained with fresh concentrated nitric acid and using the solution of mixed salts and nitric acid for treating new raw material.

In testimony whereof, I affix my signature.

HANS JOACHIM FALCK.